United States Patent [19]

Handa et al.

[11] Patent Number: 5,854,950

[45] Date of Patent: Dec. 29, 1998

[54] DATA RECORDING DEVICE FOR CAMERA AND FILM TYPE CAMERA WITH LENS

[75] Inventors: Masaaki Handa; Masao Akaiwa, both of Suwa, Japan

[73] Assignee: Seiko Epson Corporation, Tokyo, Japan

[21] Appl. No.: 910,872

[22] Filed: Aug. 13, 1997

[30] Foreign Application Priority Data

Aug. 30, 1996 [JP] Japan .................................... 8-229724
Jun. 9, 1997 [JP] Japan .................................... 9-151394

[51] Int. Cl.$^6$ .................................................. G03B 17/24
[52] U.S. Cl. ........................................... 396/310; 396/318
[58] Field of Search .................................. 396/281, 282, 396/292, 310, 315, 318, 319, 429

[56] References Cited

U.S. PATENT DOCUMENTS

| 4,449,805 | 5/1984 | Sakurada et al. | 396/318 |
| 5,258,805 | 11/1993 | Aoki et al. | 396/292 |
| 5,606,391 | 2/1997 | Aoki et al. | 396/292 |

FOREIGN PATENT DOCUMENTS 56-139141  10/1981  Japan .

*Primary Examiner*—Russell Adams
*Attorney, Agent, or Firm*—Eric B. Janofsky

[57] ABSTRACT

A data recording device is provided which is capable of preventing the recording of incorrect date and time data on photographic film due to malfunction of the time counter that generates date and time data for recording. Drive IC 31A of data recording device 30 is equipped with time counter 161 that generates date and time data for recording, and the count value of the date and time data generated by this time counter is stored in storage circuit 33. At the point immediately prior to the operation that changes the count value of the time counter, the date and time data in storage circuit 33 and the counter value of the date and time data from the time counter are compared in comparison judgment circuit 34, and if the two do not agree, malfunction detection signal 34S which indicates that the time counter has malfunctioned is output to driver 162 and the recording of date and time data by liquid crystal display panel 12 is stopped. Therefore, the recording of incorrect date and time data on the photographic film can be reliably prevented.

12 Claims, 9 Drawing Sheets

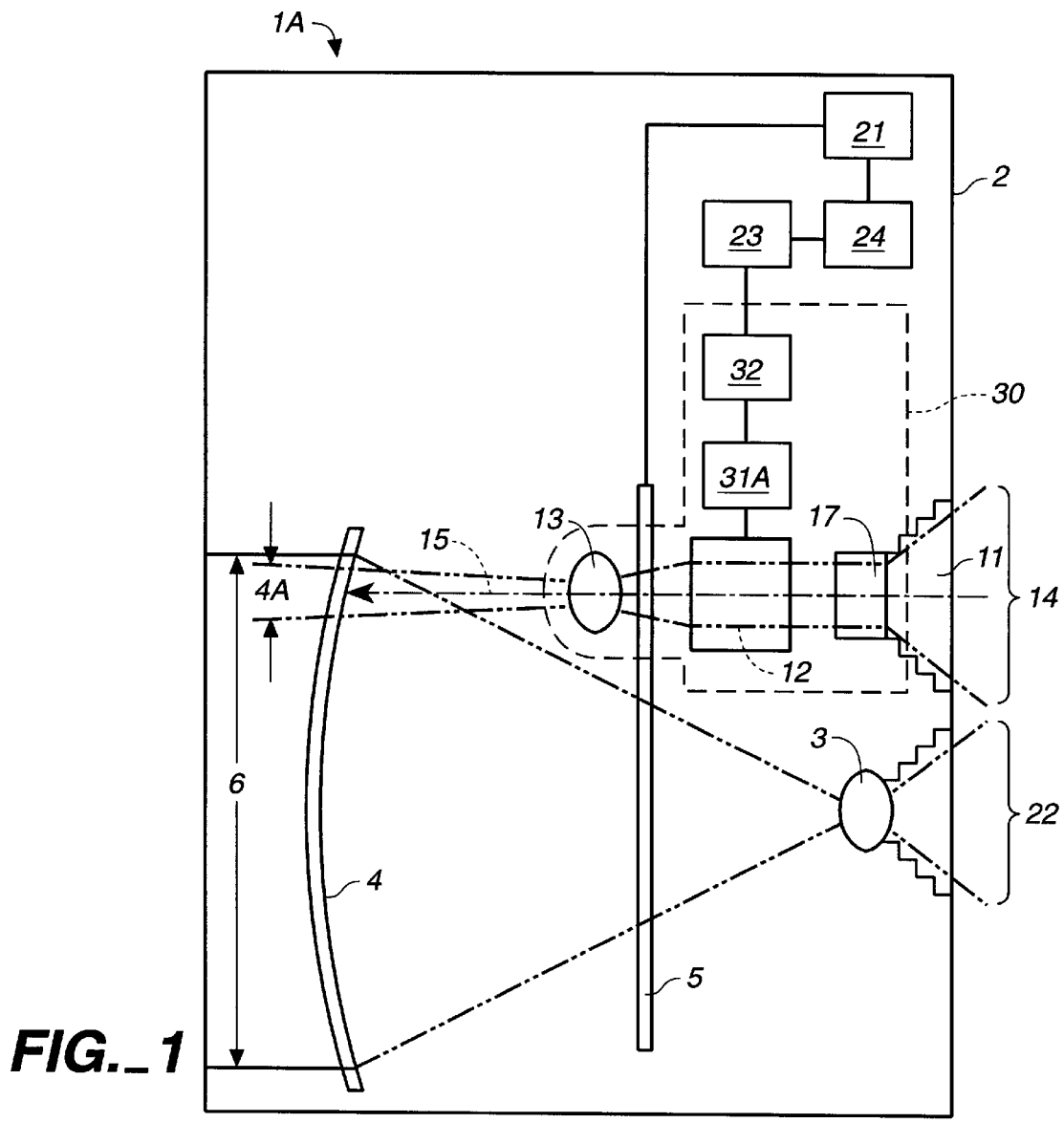
FIG._1

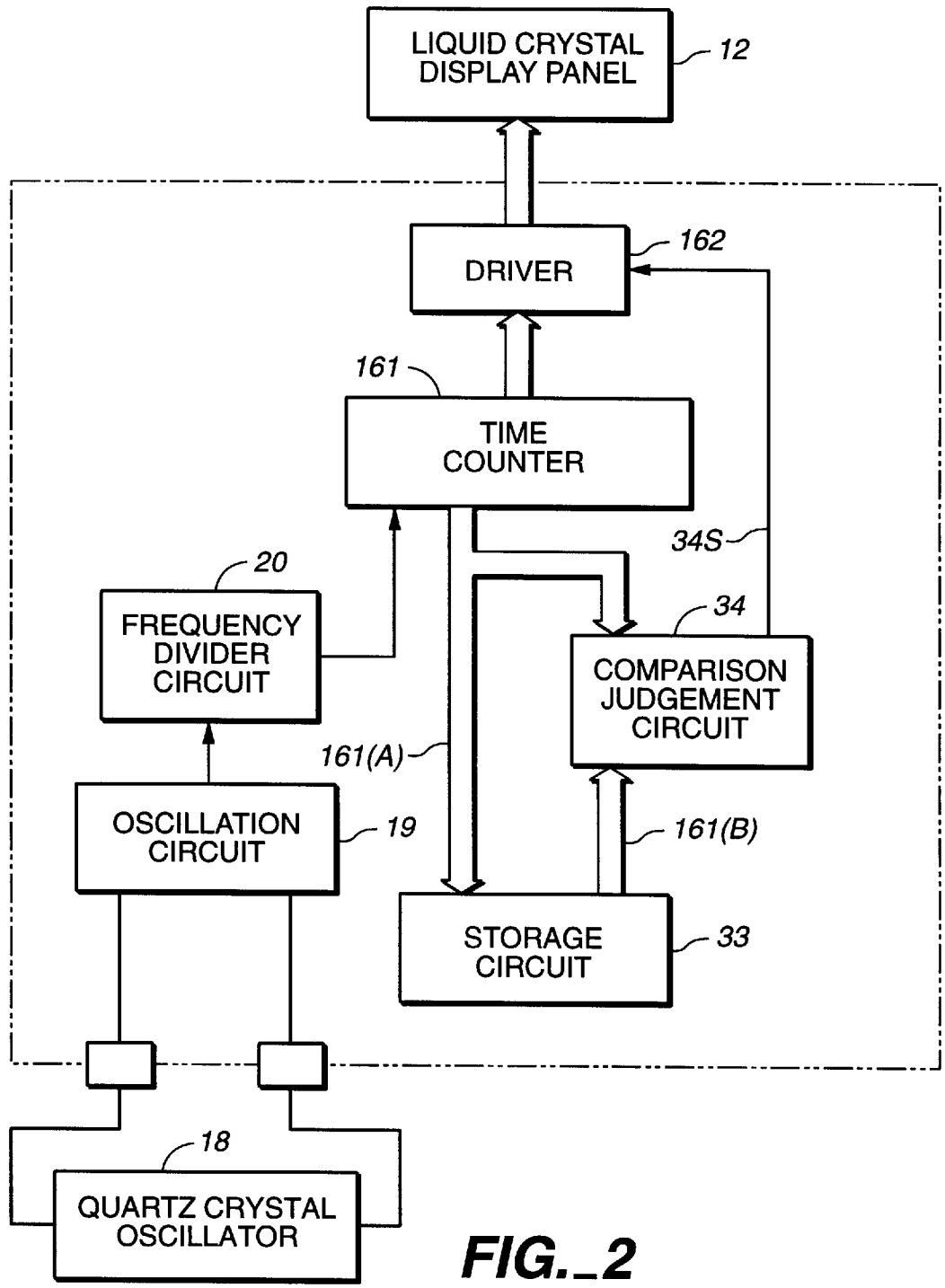
FIG._2

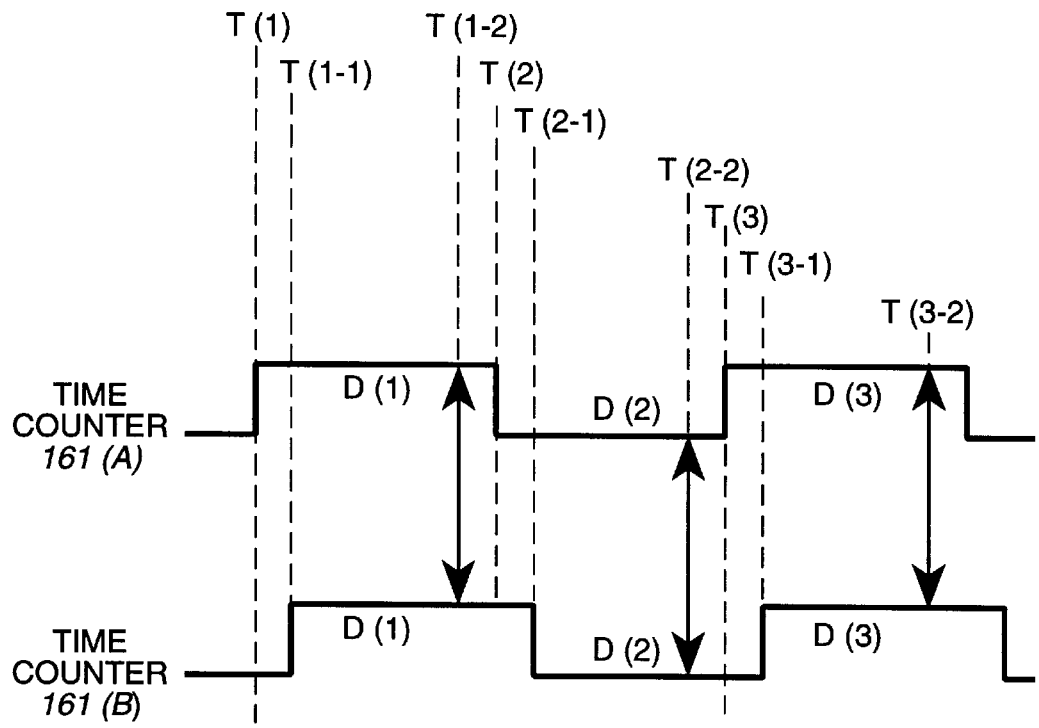
FIG._3A
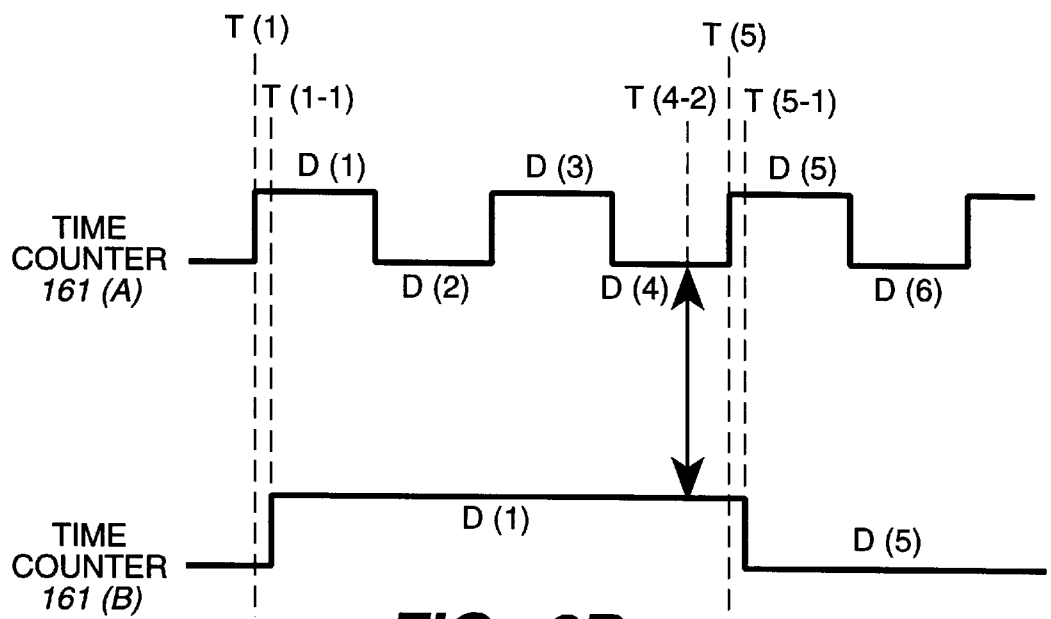
FIG._3B

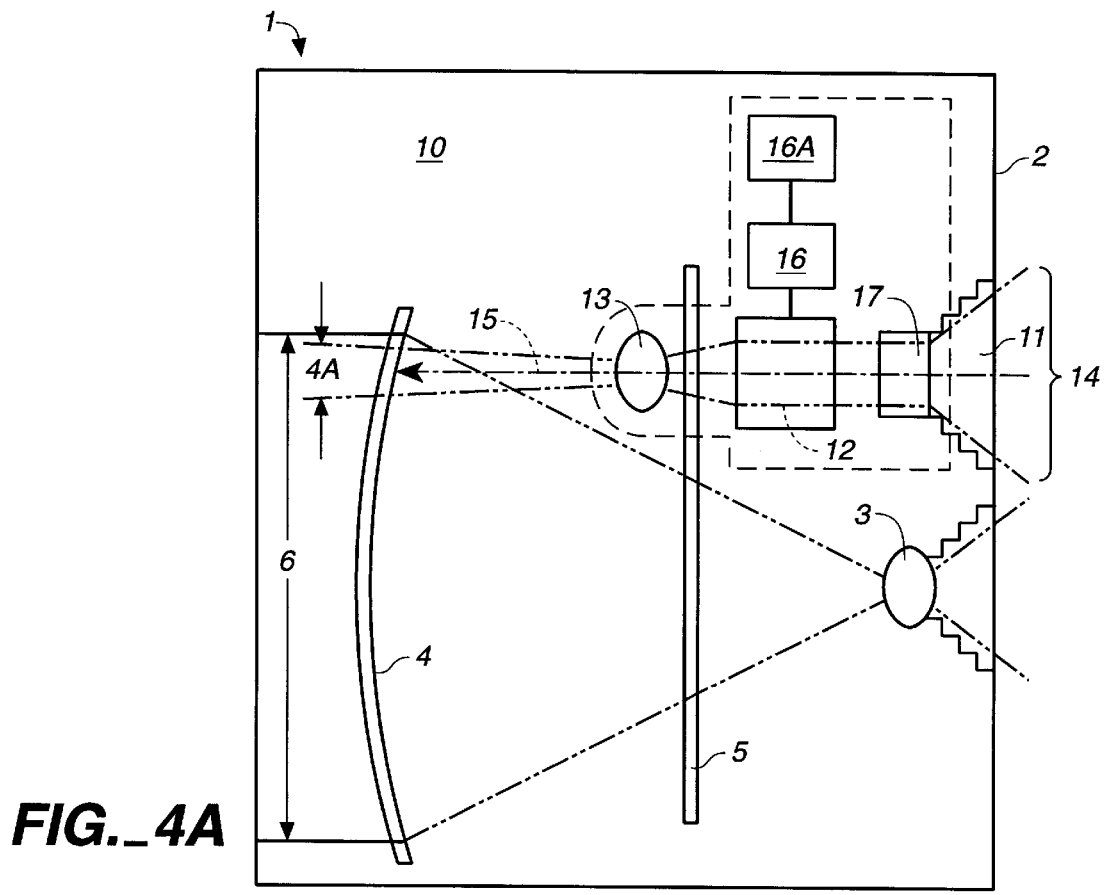
FIG._4A
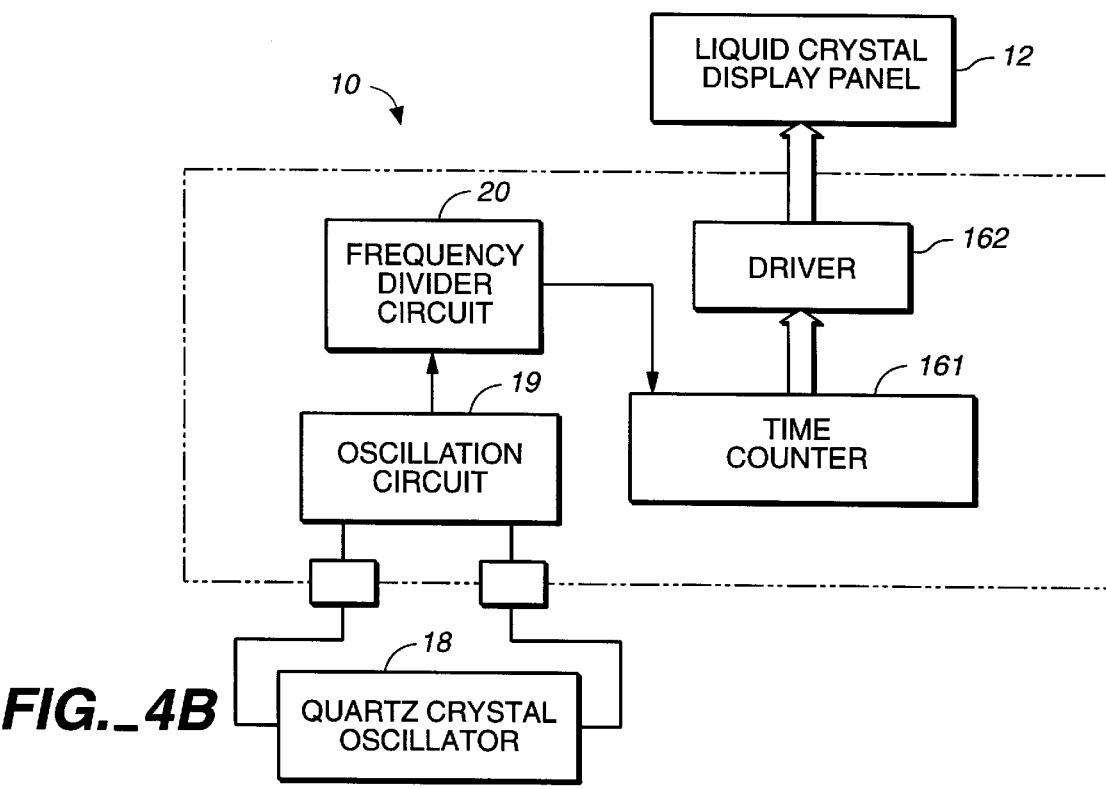
FIG._4B

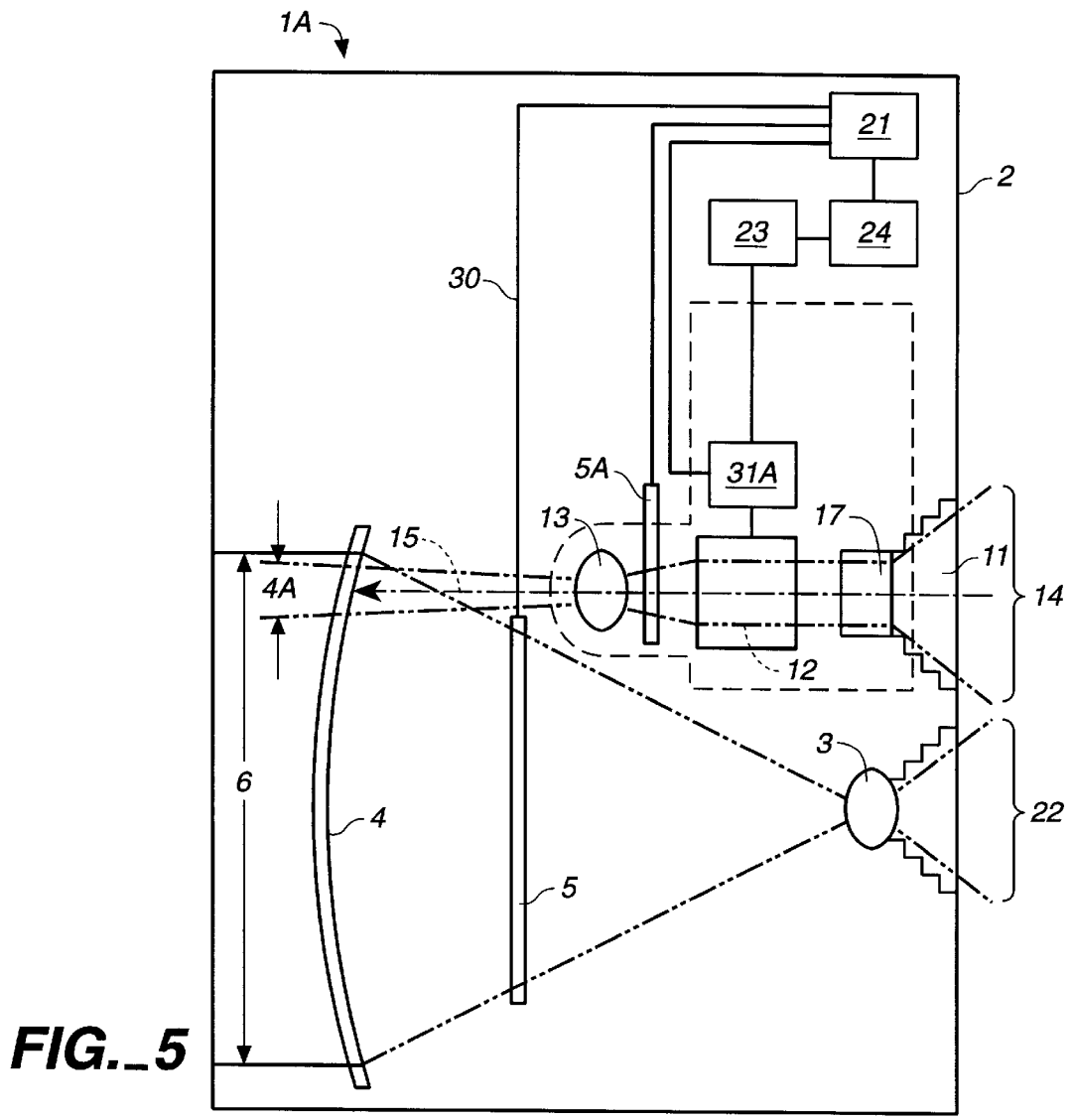
FIG._5

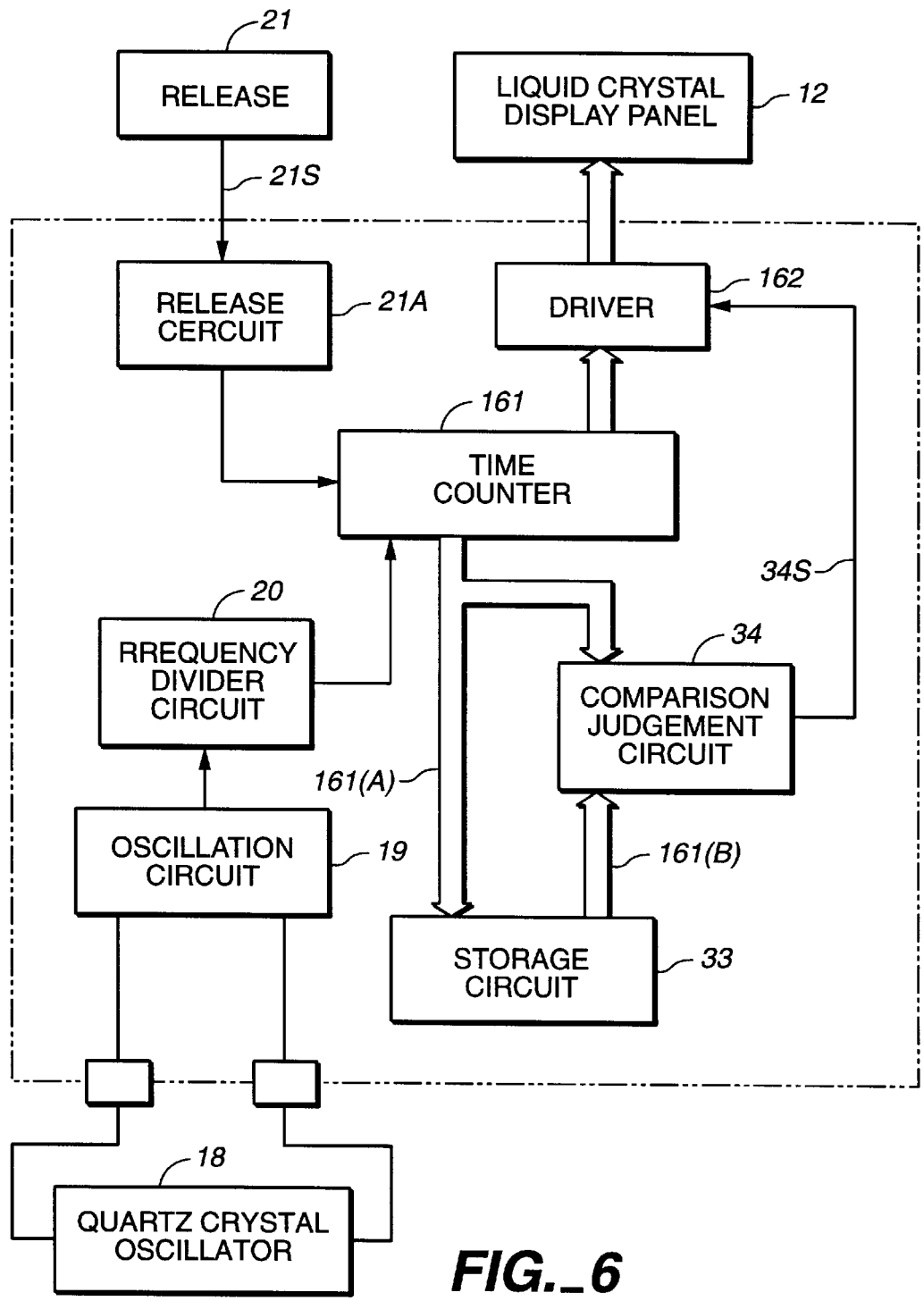
FIG._6

DISPLAY OF DECEMBER 25, 1980
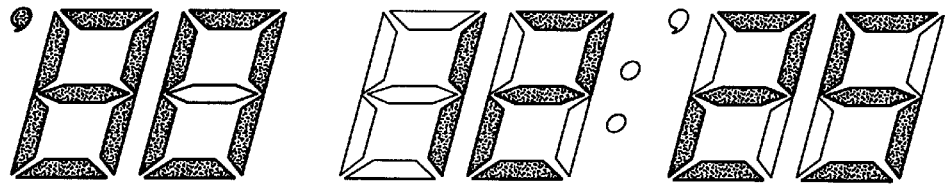
☐ INDICATES OFF SEGMENT
▨ INDICATES ON SEGMENT
FIG._7A
TOTAL NON-DISPLAY CONDITION
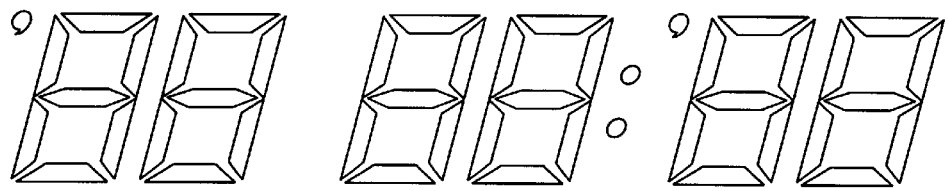
FIG._7B

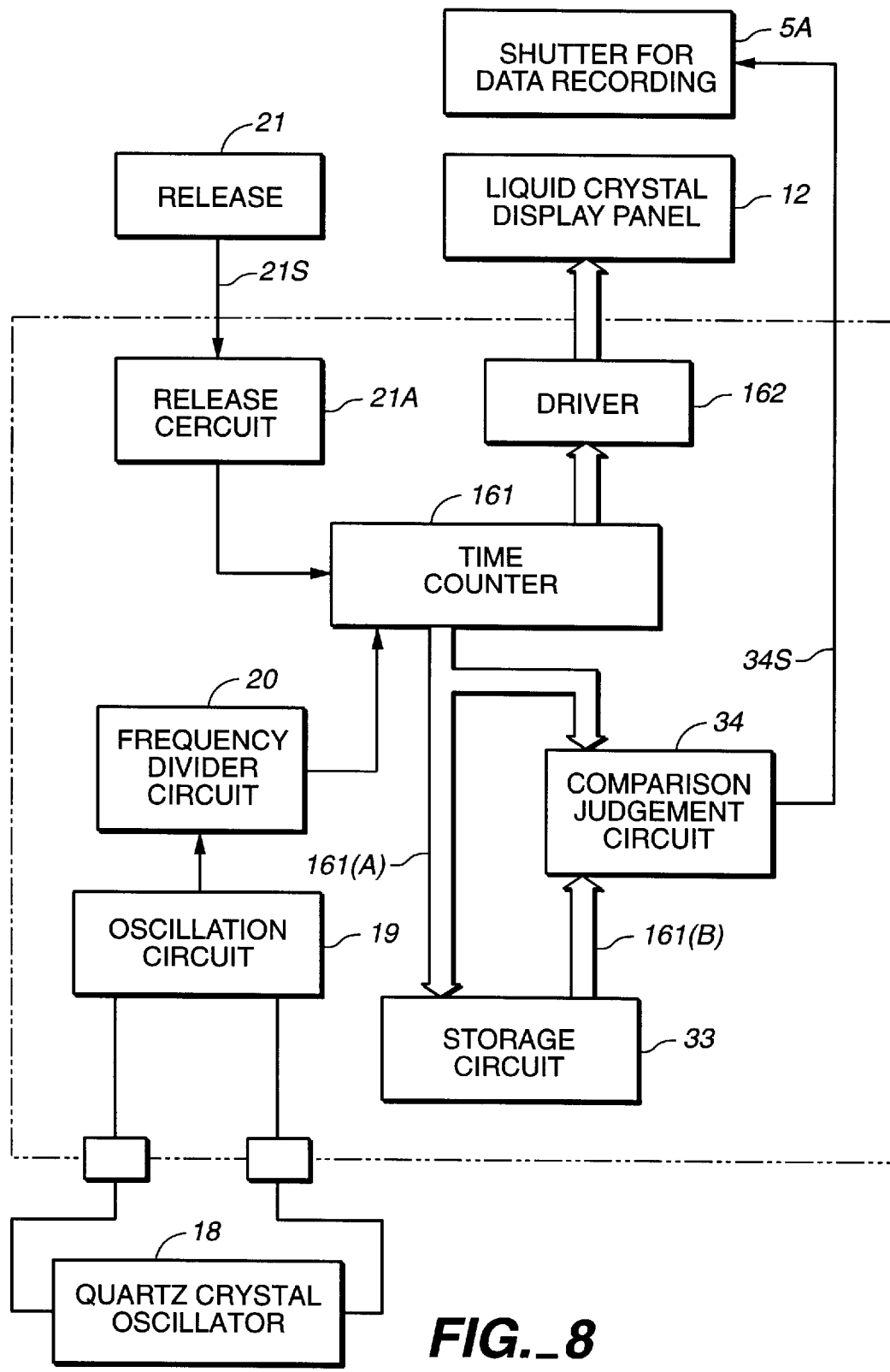
FIG._8

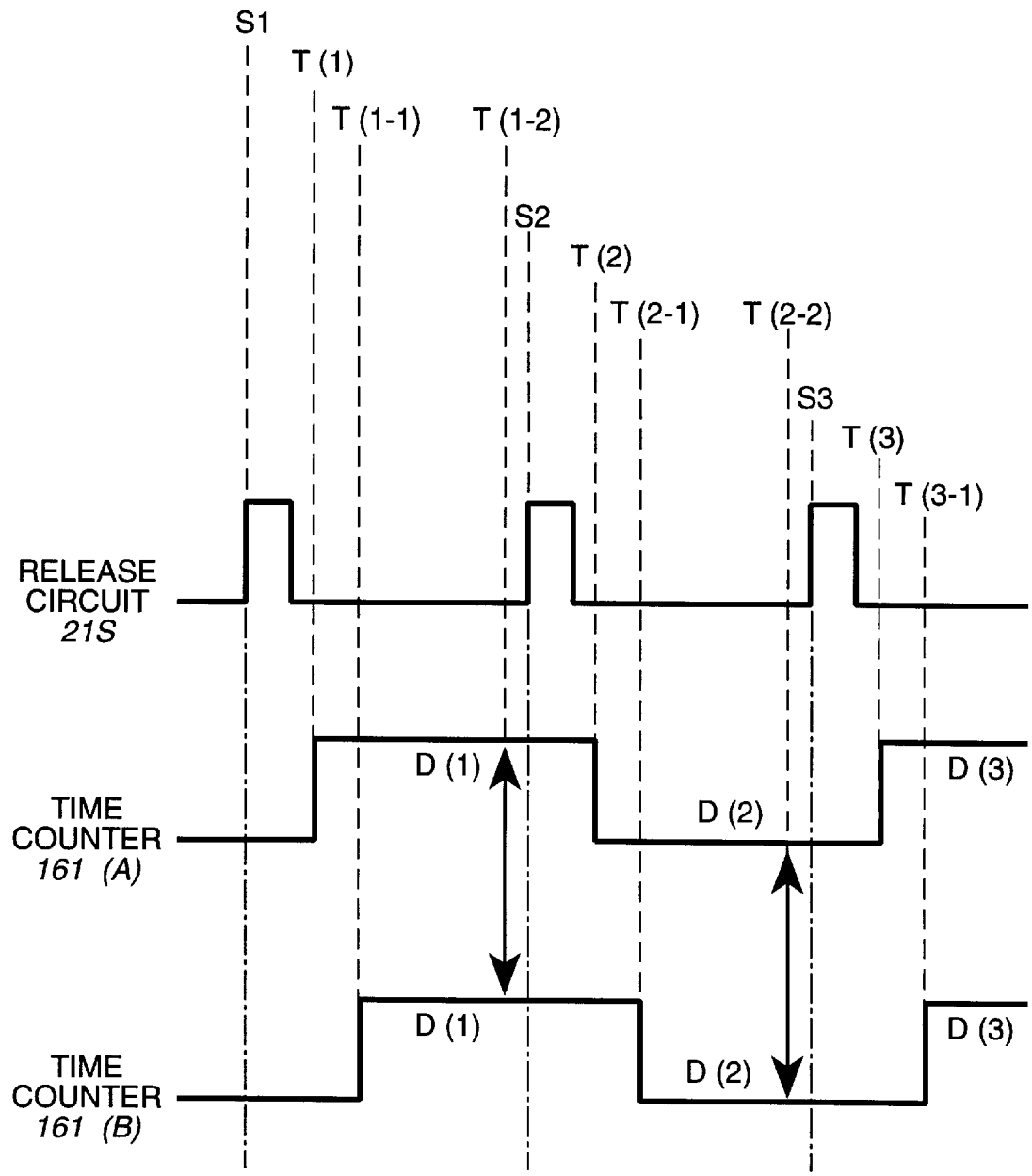
FIG._9

DATA RECORDING DEVICE FOR CAMERA AND FILM TYPE CAMERA WITH LENS

BACKGROUND OF THE INVENTION

1. Field of the Invention

The present invention relates to a data recording device for cameras for recording data, on a magnetic recording medium by a magnetic head, etc., or other medium by display elements of a liquid crystal display. In particular, the present invention relates to a malfunction detection circuit and data recording control of a timing counter for detecting a malfunction by an outputting time counter. Additionally, the present invention relates to a lens-equipped film type camera in which a data recording device for a camera has the above configuration built in.

2. Description of the Related Art

Conventional data recording devices for recording data, such as, date and time data, on photographic film have been traditionally equipped with a liquid crystal display panel, capable of displaying the desired data to be recorded on the photographic film and a light path for guiding light from a light source to the liquid crystal display panel. These elements were configured such that the printed display pattern displayed on the liquid crystal display panel was projected on the photographic film surface.

These data recording devices include those equipped with a dedicated light source as the light source for printing data and those that used external light as the light source for printing data.

A data recording device of the latter type is disclosed in Japanese Laid-Open Utility Model Application 56-139141. Data recording devices that use external light as the light source for recording data are generally built into lens-equipped film type cameras as shown in FIG. 4A. Lens 3, for taking photographs, is attached to the front surface of device package 2 and lens-equipped film type camera 1, having photographic film 4 is loaded therein. Shutter 5, capable of opening and closing to allow light to impinge on photographic film 4 is disposed between lens 3 and photographic film 4. When shutter 5 opens a photograph is projected on angle of view 6 of photographic film 4.

Data recording device 10 is built into device package 2. This data recording device 10 comprises external light intake member 11 formed on a front surface of device package 2, transmission type liquid crystal display panel 12 for data display and recording which is capable of forming a data pattern as a transmission area, drive integrated circuit (IC) 16 for driving liquid crystal panel 12, battery 16 A, and imaging lens 13.

External light 14 received from external light intake member 11 arrives at liquid crystal display panel 12 along light path 15 leading to photographic film 4 from external light intake member 11. External light 14 passes through liquid crystal display panel 12 and is exposed on photographic film 4 via imaging lens 13 after excess light has been blocked. As a result, a data image corresponding to the data pattern is printed in specified area 4A1 on photographic film 4. This data recording operation is controlled by shutter 5 for taking photographs, and it is performed in conjunction with the normal photography operation. A configuration is normally used that disposes condenser lens 17 in the light path between external light receptor 11 and liquid crystal display panel 12 in order to facilitate sufficient exposure of the data pattern there.

Drive IC 16 of liquid crystal display panel 12 comprises, as shown in FIG. 4B, timer counter 161 and driver 162 that controls drive of liquid crystal display panel 12 based on the date and time data output from time counter 161. As such, liquid crystal display panel 12, displays a data pattern corresponding to the date and time data. Time counter 161 counts the time based on reference clock signal 201 supplied from external quartz crystal oscillator 18, oscillation circuit 19 and frequency divider circuit 20.

Here, time counter 161 may malfunction because of any noise in supplied reference clock signal 201, which may cause deviation in the count value for the date and time. The data recording device may include a monitor liquid crystal panel for monitoring the recorded date and time data and a correction switch that corrects the data time data. However, from a cost standpoint, it is difficult to equip a monitor function and correction mechanism for the date and time data in a data recording device built into a low-cost camera such as a lens-equipped film type camera. For this reason, the user of the camera cannot know if the time counter malfunctions nor can the user correct incorrect date and time data. Therefore, incorrect date and time data may be written on the photographic film. When the contents imprinted on the film and the date and time do not match, it causes serious problems.

OBJECTS OF THE INVENTION

Therefore, it is an object of the present invention to overcome the aforementioned problems.

It is another object of the present invention to provide a data recording device for cameras capable of preventing the imprinting of incorrect date and time data on the photographic film due to the malfunction of the time counter which outputs date and time data to be imprinted as well as the lens-equipped film type camera in which the device is built in.

It is a further object of the present invention to provide a data recording device which reliably detects malfunctioning of the time counter, which outputs date and time data as the recording data, at the time of recording in a lens-equipped film type camera in which it is built in. Therefore, even if a date and time data monitor function or date and time data correction function is not provided, the recording of incorrect date and time data generated by a malfunction on the photographic film can be reliably prevented.

SUMMARY OF THE INVENTION

In order to solve the above problems, this invention employs a configuration for a data recording device for a camera that records date and time data output from a time counter on a recording medium via a recording element. A storage circuit is provided that updates its recorded contents by writing the counter value for the date and time data from the time counter. A comparison judgment circuit judges when the time counter malfunctions when the count value for the date and time data from the time counter and count value for the date and time data of the storage circuit are compared before entering the update operation for the storage circuit and both count values are not the same, or the count value for the date and time data from the time counter and the date and time data of the storage circuit are compared after completion of the update operation for the storage circuit and the two counter values do not have the prescribed count difference.

According to this configuration, the update operation for the storage circuit may be performed, for example, every time the operation for changing the display of the count value of the time counter is performed. In this case, the comparison operation of the comparison judgment circuit may be performed any time between an update operation of the count value of the time counter and the next update operation of the count value, or any time during the next update operation after an update operation of the time counter.

When the comparison judgment circuit judges that the time counter has malfunctioned, it is desirable that the date and time data not be recorded on the recording medium. By employing a data recording device for the lens-equipped film type camera of this invention configured in this manner, it is possible to recognize the occurrence of incorrect date and time data even without a monitor function or a correction function. It is also possible to avoid recording the incorrect date and time data on the recording medium.

It is desirable to incorporate the data recording device equipped with a circuit for detecting the malfunction of the time counter of this invention in a low-cost camera such as a lens-equipped film type camera.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a schematic drawing showing a lens-equipped film type camera according to a first embodiment of the present invention;

FIG. 2 is a block diagram showing the principal components of the data recording device built into the camera in FIG. 1;

FIG. 3A and FIG. 3B are timing charts of the operation of the data recording device of FIG. 2;

FIG. 4A is a schematic drawing showing a conventional lens-equipped film type camera having a built in data recording device. FIG. 4B is a block diagram showing the principal components of the data recording device of FIG. 4A;

FIG. 5 is a schematic drawing showing another lens-equipped film type camera according to a second embodiment of the present invention;

FIG. 6 is a block diagram showing the principal components of a data recording device according to a third embodiment of the present invention;

FIG. 7A shows an example of normal display in the liquid crystal display panel and FIG. 7B shows a total non-display condition;

FIG. 8 is a block diagram showing the principal components of the data recording device according to the third embodiment of FIG. 6; and FIG. 9 is a timing chart for explaining operation of the second embodiment of FIG. 8.

DESCRIPTION OF THE PREFERRED EMBODIMENTS

Below is an explanation referring to the drawings of a lens-equipped film type camera to which a recording device for a camera of this invention has been applied.

First Embodiment

FIG. 1 shows a lens-equipped film type camera wherein is mounted a data recording device according to a first embodiment of the present invention.

The basic configuration of lens-equipped film type camera 1A is the same as the conventional camera shown in FIG. 4A in that lens 3 for taking photographs is attached to the front of device package 2 inside which the recording medium photographic film 4 is loaded. Shutter 5 for taking photographs is disposed between lens 3 for taking photographs and photographic film 4, and when shutter 5 opens, a photograph is imprinted in angle of view 6 on photographic film 4. Of course, as a will be appreciated, by the present invention may be incorporated in other types of cameras.

Shutter 5 is opened by pressing release 21, and as a result subject 22 is projected on photographic film 4 through lens 3 for taking photographs. At the same time shutter 5 opens, strobe unit 24, which uses strobe battery 23 as a drive power source, emits light.

Data recording device 30 built into device package 2 comprises external light as intake member 11 formed on the front surface of device package 2, liquid crystal display panel 12 for transmission data recording capable of forming data patterns as a transparent member, integrated circuit (IC) 31A for panel drive, battery 32 which serves as the drive power source for IC 31A, and imaging lens 13. External light 14 taken in via external light intake member 11 travels to liquid crystal display panel 12 along light path 15 extending from external light intake member 11 to photographic film 4. External light 14 passes through liquid crystal display panel 12 where excess light is blocked, passes through imaging lens 13 and is exposed on photographic film 4. As a result, a data pattern, i.e., data image corresponding to date and time data comprising the year, month, day, hour, minute and second (referred to as date and time data below), formed by liquid crystal display panel 12 is projected and recorded on designated area 4A on photographic film 4.

Here, in the embodiment, this kind of data recording operation is controlled by shutter 5 for taking photographs and is performed in conjunction with the normal operation of taking a photograph. That is, shutter 5 for taking photographs is set to a size that will block light path 15 for data recording, and by pressing release 21, recording referred to as the imprinting of data is performed in addition to the taking of pictures.

Data recording device 30 is equipped with condenser lens 17 disposed in light path 15 between external light intake member 11 and liquid crystal display panel 12 such that sufficient exposure of the data pattern can be achieved. FIG. 2 is a block diagram showing mainly the principal components of drive IC 31A in data recording device 30. Drive IC 31A of the first embodiment outputs signal 161(A) from time counter 161. Storage circuit 33, which comprises an EEPROM or other suitable device, stores output 161(A). Data recording device 30 is also equipped with comparison judgment circuit 34 which compares output 161(A) of time counter 161 and output 161(B) of the stored contents of storage circuit 33. If output 161(A) and output 161(B) are detected to not be the same by comparison judgment circuit 34, malfunction detection signal 34S is output from comparison judgment circuit 34 and is supplied to driver 162. When driver 162 receives signal 34S, drive of liquid crystal display panel 12 is stopped after that. As a result, recording performed by imprinting date and time data on photographic film 4 is not performed.

In this embodiment, as shown in FIG. 3A in signal 161 (A), the count values D(1), D(2), D(3), . . . of time counter 161 are read out at times T(1), T(2), T(3), . . . corresponding to signal 161 (B) the count of the counted date and time data and at times T(1—1), T(2-1), T(3-1), . . . delayed only slightly from the update times in time counter 161, and the contents of storage circuit 33 are updated by the count values that are read out.

After the stored contents of storage circuit 33 are updated, the count value of time counter 161 and the stored contents of storage circuit 33 are compared by comparison judgment circuit 34 at times T(1-2), T(2—2), T(3-2), . . . immediately prior to the update operation of the count value of the next date and time data and are judged whether or not they are the same.

For example, the count value of time counter 161 is updated at time T(1), and this count value becomes D(1). At time T(1-2) immediately prior to time T(2) of the update operation of the next count value, the contents D(1) of storage circuit 33 and the contents of time counter 161 are compared. When time counter 161 is operating normally, the contents of storage circuit 33 and the contents of time counter 161 will naturally agree.

If noise due to static electricity, for example, enters reference clock signal 201 supplied to time counter 161, however, time counter 161 may update the counter value at an inappropriate time or other problems may occur. In this case, the count value of time counter 161 will become value D(1A) which is different from D(1) at the time of the comparison operation by comparison judgment circuit 34. Therefore, the result of comparison by comparison judgment circuit 34 will indicate a judgment that the two are not the same.

When the judgment result shows that the two values are not the same, comparison judgment circuit 34 outputs malfunction detection signal 34S, which is supplied to driver 162. When driver 162 receives the signal 34S, further drive of liquid crystal display panel 12 is inhibited. Therefore, the recording of incorrect date and time data on photographic film 4 by imprinting can be prevented.

Similarly, as shown in FIG. 3B, count values D(1), D(5), . . . of time counter 161 are read out at times T(1), T(5), . . . corresponding to the count of the counted date and time data and at times T(1—1), T(5-1), . . . delayed only slightly from the update times in time counter 161, and the contents of storage circuit 33 are updated by the count values that are read out. Even if a method is employed whereby the count value of time counter 161 and the stored contents of storage circuit 33 are compared in comparison judgment circuit 34 at prescribed time T(4-2) after the stored contents of storage circuit 33 are updated and the value is judged whether or not it is the prescribed count difference, the same effect as the above-described method can be achieved.

Further, in this embodiment, the comparison judgment of date and time data is performed immediately before the update operation of the count value and the date and time data of storage circuit 33 is updated immediately after the update operation of the count value. That is, in this embodiment, in addition to writing the date and time data to storage circuit 33 while factors other than the update operation of the count value have had little effect, the date and time data of time counter 161 and the date and time data of storage circuit 33 are compared at a point at which as much time as possible has elapsed after the write operation, i.e., at a point immediately before the update operation of the next count value. Therefore, it is possible to raise the accuracy of comparison judgment by comparison judgment circuit 34.

Second Embodiment

In addition to the embodiment described above, a number of configurations can be considered to prevent the imprinting of incorrect date and time data on the photographic film.

For example, a configuration is described in FIG. 5. The basic configuration of the lens-equipped film type camera in FIG. 5 is the same as the prior art in FIG. 4A, in that lens 3 for taking photographs is attached to the front surface of device package 2 wherein photographic film 4, which serves as the recording medium, is loaded. Shutter 5 for taking photographs is disposed between lens 3 for taking photographs and photographic film 4, and when shutter 5 is opened, a photograph is imprinted on angle of view 6 of photographic film 4.

Shutter 5 is opened by pressing release 21, and as a result subject 22 is projected on photographic film 4 through lens 3 for taking photographs. At the same time shutter 5 opens, strobe unit 24, which uses storage battery 23 as a drive power source, emits light.

Data recording device 30 built into device package 2 comprises external light intake member 11 formed on the front surface of device package 2, liquid crystal display panel 12 for transmission data recording capable of forming data patterns as a transparent member, IC 31A for panel drive, shutter 5A for data recording and imaging lens 13. External light 14 taken in via external light intake member 11 travels to liquid crystal display panel 12 along light path 15 extending from external light intake member 11 to photographic film 4. External light 14 passes through liquid crystal display panel 12 where excess light is blocked, shutter 5A for data recording opens like the shutter 5 for taking photographs, and then the light passes through imaging lens 13 and is exposed on photographic film 4. As a result, a data image corresponding to the data pattern formed by liquid crystal display panel 12 is projected and recorded on designated area 4A on photographic film 4.

That is, shutter 5A for data recording operates the same as shutter 5 for taking photographs when release 21 is pressed. External light 14 taken in through external light intake member 11 arrives at liquid crystal display panel 12 along light path 15 extending from external light intake member 11 to photographic film 4. External light 14 passes through liquid crystal display panel 12 where excess light is blocked, passes through imaging lens 13 and is exposed on photographic film 4. As a result, a data image corresponding to the data pattern formed by liquid crystal display panel 12 is projected and recorded on designated area 4A on photographic film 4.

Here, in this embodiment, the data recording operation is controlled by shutter 5A for data recording and is performed in conjunction with the normal operation of taking a photograph. That is, shutter 5A for data recording is set to a size that will block light path 15 for data recording, and by pressing release 21, recording referred to as the imprinting of data is performed in addition to the taking of pictures.

Data recording device 30 is also equipped with condenser lens 17 disposed between external light intake member 11 and liquid crystal display panel 12 to facilitate sufficient exposure of the data pattern.

Next, FIG. 8 is a block diagram showing mainly the principal components of drive IC 31A in data recording device 30 of the lens-equipped film type camera in FIG. 5.

Drive IC 31A in FIG. 8 outputs output 161(A) of time counter 161. Storage circuit 33 made up of an EEPROM or any other suitable device stores output 161(A). It is also equipped with comparison judgment circuit 34 which compares output 161(A) of time counter 161 and output 161(B) of the stored contents of storage circuit 33. If comparison judgment circuit 34 detects that output 161(A) and output 161(B) do not agree, then malfunction detection signal 34S is output from comparison judgment circuit 34 and is supplied to shutter 5A for data recording. When shutter 5A for data recording receives malfunction detection signal 34S, shutter operation is stopped. As a result, the recording of date and time data on photographic film 4 by means of imprinting is not performed. As will be appreciated, drive IC 31A has been described on a high level basis. It is within the realm of one skilled in the art to design a specific implementation of such circuits.

By this means, subject 22 is projected onto photographic film 4 through lens 3 for taking photographs, but the incorrect date and time data displayed by liquid crystal display panel 12 for recording data is not projected and recorded on photographic film 4. Therefore, though the date and time data is not recorded, subject 22 is reliably recorded on photographic film 4. The user can record subject 22 without recording incorrect date and time data.

The above configuration achieves the purpose by separating the shutter for taking pictures and the shutter for recording data.

Further, the power source for the panel drive IC and the power source that drives the strobe unit are constituted by the same battery 23. By this means, it is possible to make the camera smaller. Also, by using the connection terminal and other components that connect the battery and the device in common, the number of parts can be reduced and cost can be kept low.

Third Embodiment

Further, FIG. 6 is a block diagram showing mainly the principal components of drive IC 31A of a data recording device, which is a third embodiment of the recording device for a camera of the invention. Here, drive IC 31A receives signal 21S from release 21 and time counter 161 outputs output 161(A) of time counter 161 in response to release circuit 21A. Storage circuit 33 made up of an EEPROM or any other suitable device stores output 161(A). Further, comparison judgment circuit 34 compares output 161(A) of time counter 161 and output 161(B) of the stored contents of storage circuit 33. If comparison judgment circuit 34 detects that output 161(A) and output 161(B) do not agree with each other, then malfunction detection signal 34S is output from comparison detection circuit 34 and is supplied to driver 162. When driver 162 receives signal 34S, the displayed elements of liquid crystal display panel 12 all go to a non-display condition from that time.

FIG. 7A shows an example of a display of Dec. 25, 1980, and FIG. 7B shows an example of a total non-display condition for the sake of comparison with an example of normal display contents. Liquid crystal display panel 12 does not stop drive by driver 162, but because there are cases wherein on segments may become unstable due to static electricity or noise or some cases wherein segments may become on and go to a transparent condition due to static electricity or noise, by forcing the display contents to a total non-display condition by reliably cutting off the light in light path 15 regardless of the operation of the shutter in the camera, recording on photographic film 4 can be stopped.

In this embodiment, as shown in FIG. 9, count values D(1), D(2), D(3), . . . of time counter 161 are read at times S1, S2, S3, . . . when the shutter switch is pressed and signal 21S is input to release circuit 21A from the release, at times T1, T2, T3, . . . which are times delayed only slightly from release signal 21S, and at times T(1—1), T(2-1), T(3-1), . . . which are also delayed only slightly, and the contents of storage circuit 33 are updated by the count values that are read out, whereby date and time data are measured.

After completion of the stored contents of storage circuit 33, the stored contents of time counter 161 and of storage circuit 33 are compared in comparison circuit 34 by the signal from release circuit 21A when it receives the next release signal, and it is judged whether or not these values are the same.

For example, the count value of time counter 161 when release signal 21S from the release is received by release circuit 21A and the signal is output to time counter 161 by release circuit 21A at time T(1) is D(1). At time T(1—1) immediately prior to the next time T(2), count value D(1) is written and stored in storage circuit 33, and the stored contents of storage circuit 33 become D(1).

The date and time data contents D(1) of storage circuit 33 and the contents of time counter 161 are compared at time T(1–2) immediately prior to time T2 at which the release signal is received from the next release. When time counter 161 is operating normally, the counter value D(1) of storage circuit 33 and the contents of time counter 161 will naturally agree.

However, if noise due to static electricity enters reference clock signal 201 supplied to time counter 161, time counter 161 will perform inappropriate time operations. In this case, its value will be different from the count value D(1A) of time counter 161 at the time of the comparison operation performed by comparison judgment circuit 33. Therefore, comparison judgment circuit judges from the result of the comparison that the two are different.

If the two are different in the result of the comparison, malfunction detection signal 34S is output from comparison judgment circuit 34 and is supplied to driver 162. When driver 162 receives the signal 32S, the displayed contents of liquid crystal display panel 12 go to a non-display condition from that point. Therefore, the recording of incorrect date and time data on photographic film 4 can be prevented.

Further, in this embodiment, comparison of date and time data is performed prior to release signal 21S, and the updating of the date and time data in storage circuit 33 is performed immediately after release signal 23S. That is, in this embodiment, in addition to writing the date and time data to storage circuit 33 while factors other than the release operation by release signal 32S have had little effect, the date and time data of the time counter and the date and time data of storage circuit 33 are compared at a point during the time from a release operation until the next release operation, i.e., at a point immediately before the next release operation. Therefore, even if a malfunction of reference clock signal 201 supplied to time counter 161 should occur due to a rapid drop in the power supply because of repeated release operations, it is possible to accommodate for this and raise the accuracy of comparison judgment by the comparison judgment circuit.

The above data recording device used external light as the light source for data recording. Instead of this, a dedicated light source for data recording can also be used.

Further, a transmission type device is used as the liquid crystal display panel. A positive type liquid crystal display panel can be used, however, that forms the data pattern as the light-blocking member.

Also, in the above embodiment, output 34S of comparison judgment circuit 34 is used to stop the recording of data in the event the time counter malfunctions. A function may be added, however, that warns of a malfunction of the time counter.

Of course, the data recording device of this invention can also be applied to simple cameras other than the lens-equipped film type camera described above.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

| Reference Numerals | |
|---|---|
| 1A | lens-equipped film type camera |
| 2 | device package |
| 3 | lens for taking photographs |
| 4 | photographic film |
| 5 | shutter for taking photographs |
| 30 | data recording device |
| 11 | external light intake member |
| 12 | liquid crystal display panel |
| 13 | imaging lens |
| 14 | external light |
| 15 | light path |
| 17 | condenser lens |
| 18 | quartz crystal oscillator |
| 19 | oscillation circuit |
| 20 | frequency divider circuit |
| 31A | IC for liquid crystal display panel drive |
| 33 | storage circuit |
| 34 | comparison judgment circuit |
| 34S | malfunction detection signal |
| 161 | time counter |
| 162 | driver |

What is claimed is:

1. A data recording device for recording data on a recording medium comprising:
 a recording element;
 a time counter for providing an output to said recording element to record on the recording medium;
 a storage circuit for storing, during an updating operation, the output of said time counter as stored data; and
 a comparison judgment circuit that judges when said time counter malfunctions if at least one of:
  1) the output from said time counter having a first count value corresponding to the data and the store data stored in said storage circuit having a second count value are compared before the update operation are unequal; and
  2) the first count value and the second count value are compared -after completion of the update operation and a difference between the first and second count value exceeds a predetermined threshold.

2. The data recording device of claim 1, wherein the update operation for said storage circuit is performed for the count of said time counter.

3. The data recording device of claim 2, wherein said comparison judgment circuit compares the first and second count value during at least one of:
 1) a first predetermined time before a next update operation of the first count value of said time counter when performed before entering the update operation of said storage circuit, and
 2) a second predetermined time after a first update operation of said storage circuit and before a second subsequent update operation when performed after completion of the first update operation of said storage circuit.

4. A data recording device of claim 1, wherein when said comparison judgment circuit detects that said time counter malfunctions, the data is not recorded on said recording medium by said recording element.

5. A data recording device of claim 1 wherein the data comprises at least one of time and date.

6. A lens-equipped film type camera comprising:
 a data recording device for recording data on a recording medium comprising:
  a recording element;
  a time counter for providing an output to said recording element to record on the recording medium;
  a storage circuit for storing, during an updating operation, the output of said time counter as stored data; and
  a comparison judgment circuit that judges when said time counter malfunctions if at least one of:
   1) the output from said time counter having a first count value corresponding to the data and the store data stored in said storage circuit having a second count value are compared before the update operation are unequal; and
   2) the first count value and the second count value are compared after completion of the update operation and a difference between the first and second count value exceeds a predetermined threshold.

7. A lens-equipped film type camera of claim 6, wherein the update operation for said storage circuit is performed for the count of said time counter.

8. A lens-equipped film type camera of claim 7, wherein said comparison judgment circuit compares the first and second count value during at least one of:
 1) a first predetermined time before a next update operation of the first count value of said time counter when performed before entering the update operation of said storage circuit, and
 2) a second predetermined time after a first update operation of said storage circuit and before a second subsequent update operation when performed after completion of the first update operation of said storage circuit.

9. A lens-equipped film camera to claims 6, wherein said date and time data are not recorded on said recording medium when said comparison judgment circuit detects that said time counter has malfunctioned.

10. A lens-equipped film type camera of claim 6, further comprising a shutter, and wherein the update operation of said storage circuit is performed in synchronism with an operation of said shutter for taking photographs.

11. A lens-equipped film type camera of claim 6, further comprising a shutter, and wherein a comparison judgment operation of said comparison judgment circuit is performed at a time between an operation of said shutter for taking photographs and a next shutter operation.

12. A method for recording data on a recording medium by a recording element comprising the steps of:
 (a) providing an output by a time counter to the recording element to record on the recording medium;
 (b) storing, during an updating operation, the output of step (a) as stored data; and
 (c) judging when the time counter malfunctions if at least one of:
  1) the output from the time counter having a first count value corresponding to the data and the store data stored in step (b) having a second count value are compared before the update operation are unequal; and
  2) the first count value and the second count value are compared after completion of the update operation and a difference between the first and second count value exceeds a predetermined threshold.

* * * * *